United States Patent [19] [11] 4,200,559
Peterlein et al. [45] Apr. 29, 1980

[54] ANIONIC PAPER SURFACE SIZING AGENT

[75] Inventors: Karl Peterlein, Gladbeck; Felix Schülde, Wulfen; Klaus M. Diedrich; Volker W. Kulisch, both of Gladbeck, all of Fed. Rep. of Germany

[73] Assignee: Chemische Werke Huls A.G., Herne, Fed. Rep. of Germany

[21] Appl. No.: 916,124

[22] Filed: Jun. 16, 1978

[30] Foreign Application Priority Data

Jun. 18, 1977 [DE] Fed. Rep. of Germany ....... 2727510

[51] Int. Cl.$^2$ ............................................. C08L 3/02
[52] U.S. Cl. ..................... 260/17.4 ST; 260/17.4 BB; 260/29.7 H
[58] Field of Search ........................ 526/49, 272, 283; 260/29.7 H, 17.4 BB, 17.4 ST

[56] References Cited

U.S. PATENT DOCUMENTS

| 2,475,731 | 7/1949 | Weith | 526/272 |
| 2,608,550 | 8/1952 | Rowland | 526/281 |
| 3,188,303 | 6/1965 | Dissen | 526/272 |
| 3,442,872 | 5/1969 | Korbanka | 526/272 |
| 3,468,823 | 9/1969 | Graham | 260/17.4 ST |
| 3,890,285 | 7/1975 | Sumita | 526/272 |
| 3,925,328 | 12/1975 | Shibahara | 260/17.4 ST |
| 4,115,331 | 9/1978 | Tominaga | 260/17.4 ST |

*Primary Examiner*—Paul R. Michl
*Attorney, Agent, or Firm*—Oblon, Fisher, Spivak, McClelland & Maier

[57] ABSTRACT

Paper surface sizing agents based on aqueous solutions of copolymers of maleic acid anhydride and dicyclopentadiene, which are further reacted after preparation to produce the half amides with ammonia, or primary or secondary aliphatic amines.

5 Claims, No Drawings

ANIONIC PAPER SURFACE SIZING AGENT

BACKGROUND OF THE INVENTION

1. Field of the Invention

The present invention relates to a method for the sizing of paper surfaces by use of a statistical copolymer of maleic acid anhydride and dicyclopentadiene and to the reaction products of these copolymers.

2. Description of the Prior Art

It is generally known to size paper in the pulp form by use of rosin soaps and aluminum ions. Besides of the known sizing agents based on rosin derivatives other solutions or dispersions of polymer compositions have been utilized for the sizing of paper. The advantage of such synthetic agents arises from the fact that they can also be brought to the already finished paper surface, while a normal resin glue with aluminum ions precipitates on the paper fibers.

The utilization of synthetic polymer sizing agents allows paper sizing without addition of metal salts. As examples of such sizing agents are solutions or dispersions of statistical copolymers of unsaturated carboxylic acids and their derivatives with specific ethylenic unsaturated compounds. The degree of sizing of these, state of the art copolymer-sized papers, is not always in accord with the technical requirements, as for example in the sizing of presized paper pulp.

It is known from DT-OS 1621693 that copolymers containing succinic acid imide groups can be used for the sizing of paper surfaces, wherein said copolymers contain vinylogous compounds as comonomers. As a possible vinylogous compound is mentioned, among others dicyclopentadiene. In order to make these copolymers soluble for the paper sizing, they have to be reacted with ammonia, bases or amines. This treatment with base, causes the formation of a variety of undesired derivatives becasue of the imide group content of the copolymer.

By the above mentioned method, it is necessary in order to form the imide groups, either to transform maleic acid anhydride into maleic acid imide or to form the imide groups from a copolymer composed of maleic acid anhydride and vinylogous compounds. Because of industrial interest it is desirable to simplify the preparation of the paper sizing agents containing copolymers and also based on a need for better reproducibility, to keep the number of the above mentioned derivatives obtained upon solution, under strict control.

SUMMARY OF THE INVENTION

It is thus an object of the invention to produce anionic surface sizing agents based on aqueous solutions of statistical maleic acid anhydride copolymers wherein said copolymers are prepared from maleic acid anhydride and dicyclopentadiene.

This and other objects of the invention as will hereinafter become clear, have been achieved by the surprising discovery that copolymers of maleic acid anhydride and dicyclopentadiene, which do not contain an imide structure, —and thereby save during their preparation, one or more steps—are highly usable paper sizing agents, comparable or even superior in efficiency and strength to the above mentioned agents and which can be used for unsized as well as presized paper pulp as excellent sizing agents. The utilization of such copolymers as paper sizing agents is until now unknown.

DESCRIPTION OF THE PREFERRED EMBODIMENTS

The statistical copolymers of the present invention can be obtained by a known method, in that the polymerization is carried out by suspension-or solution polymerization in aliphatic or aromatic hydrocarbons, such as for example toluene or xylene, in alcohols, such as for example ethylene glycol or ethyl glycol, or in ethers, such as for example ethylene glycol dimethyl ether or dioxane, at temperatures between 60° and 150° C., preferentially between 70° and 90° C., in the presence of radical initiators. As initiators it is possible to use azo compounds, peroxides or hydroperoxides, such as for example azo bisisobutyronitrile, di-benzoyl-peroxide or di-tert-butyl-peroxide. The initiators are used preferentially in amounts of from 2 to 6% by weight of the comonomers.

In order to make the copolymers of the present invention, which contain anhydride groups, soluble in water, it is necessary to transform them with bases into their salts. It is, according to this invention, not necessary to neutralize all carboxyl groups, since in general a neutralization degree of about 80%—relative to the total carboxylic acid content—is sufficient. As cations, it is possible to use ammonium and/or mono-, di-or trialkyl ammonium with up to 6 carbon atoms as well as alkali metal ions. It is therefore possible to use the copolymers of the present invention in the form of their reaction products with ammonia or primary aliphatic or aromatic amines, as for example ethylamine or aniline, or secondary amines as for example diethylamine, morpholine or pyrrolidine and/or aliphatic alcohols.

These reaction products have excellent paper sizing properties.

The quantity of copolymers of the present invention necessary for the paper sizing is between 0.01 and 3, preferentially between 0.1 and 1% by weight, relative to the paper weight.

The paper sizing agent copolymers of the present invention can be used for the paper sizing with various anionic strengtheners in combination. The thus obtained sizing liquor can be reacted if necessary with customary additives. The work-up can be carried out according to well known techniques used in the manufacture of paper.

The following examples are intended merely to describe specific embodiments of the present invention and are not to be construed as a limitation of the scope thereof.

EXAMPLE 1

Sizing Agent I

Maleic acid anhydride is polymerized with dicyclopentadiene in a molar ratio of 1:1 in toluene as solvent and in the presence of benzoyl peroxide as initiator. After ending the polymerization, the product was filtered and dried of the remaining toluene. The recovered white powder had a softening point of higher than 270° C.

Sizing Agent II

Maleic acid anhydride and dicyclopentadiene are polymerized following the method of I. In order to convert the resulting copolymer into the half amide, gaseous ammonia was introduced into the polymerizate suspension, until the necessary nitrogen value was reached. After evaporation of the remaining solvent, a white powder was obtained with a softening point higher than 270° C.

Sizing Agent III (comparative)

A copolymer of maleic anhydride and styrene according to the state of the art, was prepared as the half amide as a comparison substance.

The sizing agents I to III were combined with an anionic corn starch, commercially available under the trademark "Amisol 5591", into a 10% sizing liquor. The solid contents of sizing agent to starch was 1.5:8.5. This liquor was applied by means of a labor sizing press onto a sample of 80 g of unsized paper, so that the amount of sizing agent corresponds to 0.6% of the paper weight. The drying of the paper in the sizing press followed at 140° to 160° C. in about 5 seconds. The obtained sizing values are described in Table 1.

Table 1

| Sizing Agent | I | II | III | Without |
|---|---|---|---|---|
| Water absorption (DIN 53 132) sec | 30 | 10 | <1 | <1 |
| g/m² | 20 | 12 | 10 | 89 |
| Sizing Degree (DIN 53 145) sec. | >1800 | 1160 | 157 | <1 |
| Absorption Height, 10 min. (DIN 35 106)mm | 3 | <1 | 8 | 44 |
| Surface Strength (Dennison-Test) | 18 | 16 | 14 | 11 |

The efficiency of the sizing agents of the present invention is overwhelmingly clear.

EXAMPLE 2

In analogy to Example 1, the sizing agents I–III were formulated into sizing liquors, and applied on a labor sizing press, with the difference that as paper, was utilized a pulp which was presized with 0.8% resin size. The obtained sizing values are contained in Table 2. The advantage of the sizing agents I and II with respect to the comparative agent III is clearly recognizable.

Table 2

| Sizing Agent | I | II | III | Without |
|---|---|---|---|---|
| Water absorption (DIN 53 152) sec | 300 | 300 | 300 | 300 |
| g/m² | 25 | 25 | 25 | 27 |
| Sizing Degree (DIN 53 145) sec | >1800 | 924 | 461 | 418 |
| Absorption Height, 10 min. (DIN 53 106)mm | <1 | <1 | <1 | <1 |
| Surface Strength (Dennison-Test) | 18 | 16 | 13 | 13 |

What is claimed as new and intended to be covered by letters patent is:

1. In an aqueous anionic paper surface sizing composition which comprises a solution of an anionic starch strengthener and a resin, the improvement wherein said resin consists essentially of a statistical copolymer of dicyclopentadiene and maleic anhydride produced at temperatures of 60°–150° C. and wherein said copolymer has been solubilized by reaction with ammonia or with primary or secondary amines.

2. The composition of claim 1 wherein said starch is corn starch.

3. The composition of claim 1 wherein said temperature is 70°–90° C.

4. The composition of claim 1 wherein said copolymer is a 1:1 copolymer of dicyclopentadiene and maleic anhydride.

5. A paper surface sizing composition according to claim 1 wherein said base is ammonia.

* * * * *